(12) United States Patent
Oko

(10) Patent No.: US 12,513,283 B2
(45) Date of Patent: *Dec. 30, 2025

(54) CAMERA UNIT CALIBRATING APPARATUS AND CALIBRATING METHOD

(71) Applicant: SUBARU CORPORATION, Tokyo (JP)

(72) Inventor: Akitaka Oko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,810

(22) Filed: May 15, 2024

(65) Prior Publication Data

US 2024/0397035 A1 Nov. 28, 2024

(30) Foreign Application Priority Data

May 22, 2023 (JP) .................................. 2023-083896

(51) Int. Cl.
*H04N 17/00* (2006.01)
*G02B 26/08* (2006.01)
*G06T 7/80* (2017.01)

(52) U.S. Cl.
CPC ....... *H04N 17/002* (2013.01); *G02B 26/0875* (2013.01); *G06T 7/85* (2017.01); *G06T 2207/10012* (2013.01)

(58) Field of Classification Search
CPC .... H04N 17/002; G02B 26/0875; G06T 7/85; G06T 2207/10012
See application file for complete search history.

(56) References Cited

U.S. PATENT DOCUMENTS 5,635,978 A * 6/1997 Alten ..................... H04N 7/025
725/43
7,509,664 B2 * 3/2009 Hayashida ............. H04N 5/782
725/52

(Continued)

FOREIGN PATENT DOCUMENTS

EP          4012495 A1    6/2022
JP       2012-132739 A    7/2012
(Continued)

*Primary Examiner* — Michael B. Pierorazio
(74) *Attorney, Agent, or Firm* — TROUTMAN PEPPER LOCKE LLP

(57) ABSTRACT

A camera unit calibrating apparatus performs a predetermined measurement based on images acquired by imaging the same object from different viewpoints using cameras. The apparatus includes a collimator unit and a control unit that controls the collimator unit. The collimator unit includes collimators corresponding to the cameras respectively, collimator driving devices corresponding to the collimators respectively, a support unit that supports the collimators to allow the collimators to be translated individually within a predetermined plane, and a collimator control unit that controls the collimators and the collimator driving devices. The control unit controls each of the collimator driving devices to individually set a corresponding one of the collimators to a predetermined position and orientation, and cause each of collimated images produced by the collimators to be formed at a desired position within a range of an imaging area of a corresponding one of the cameras.

6 Claims, 6 Drawing Sheets

(56) References Cited

U.S. PATENT DOCUMENTS

| | | | | |
|---|---|---|---|---|
| 7,881,657 B2* | 2/2011 | Wang | H04H 60/40 | 725/35 |
| 8,086,171 B2* | 12/2011 | Wang | H04H 60/37 | 725/35 |
| 8,290,423 B2* | 10/2012 | Wang | H04B 17/23 | 455/2.01 |
| 8,442,426 B2* | 5/2013 | Wang | H04H 60/40 | 725/35 |
| 8,490,128 B2* | 7/2013 | Davis | H04N 21/4334 | 725/62 |
| 8,516,533 B2* | 8/2013 | Davis | H04N 5/775 | 725/12 |
| 8,528,036 B2* | 9/2013 | Davis | H04N 21/42203 | 725/62 |
| 8,571,864 B2* | 10/2013 | DeBusk | G06F 16/685 | 704/235 |
| 8,639,178 B2* | 1/2014 | Anniballi | H04H 60/43 | 455/3.01 |
| 8,686,271 B2* | 4/2014 | Wang | G10H 1/361 | 84/600 |
| 8,725,829 B2* | 5/2014 | Wang | G11B 27/28 | 704/239 |
| 8,811,885 B2* | 8/2014 | Wang | H04H 60/44 | 455/2.01 |
| 11,025,807 B1* | 6/2021 | Kuperman | H04N 17/002 | |
| 11,074,720 B1* | 7/2021 | Low | G06T 7/80 | |
| 2004/0055009 A1* | 3/2004 | Hayashida | H04N 21/47 | 725/39 |
| 2004/0070669 A1* | 4/2004 | Aoyama | H04N 17/02 | 348/188 |
| 2004/0143349 A1* | 7/2004 | Roberts | G06F 16/634 | 704/278 |
| 2004/0163110 A1* | 8/2004 | Won | H04N 21/435 | 725/50 |
| 2007/0124756 A1* | 5/2007 | Covell | G06F 16/635 | 348/E7.071 |
| 2007/0212019 A1* | 9/2007 | Kimura | H04N 21/84 | 386/291 |
| 2008/0049704 A1* | 2/2008 | Witteman | H04H 60/58 | 370/342 |
| 2008/0051029 A1* | 2/2008 | Witteman | H04H 60/58 | 455/17 |
| 2008/0066098 A1* | 3/2008 | Witteman | G06Q 30/02 | 725/35 |
| 2008/0082510 A1* | 4/2008 | Wang | G06F 16/683 | |
| 2010/0205628 A1* | 8/2010 | Davis | H04N 21/472 | 455/414.1 |
| 2011/0099197 A1* | 4/2011 | Wang | G06F 16/683 | 707/769 |
| 2011/0273455 A1* | 11/2011 | Powar | G11B 27/10 | 345/473 |
| 2011/0281566 A1* | 11/2011 | Davis | H04N 21/4622 | 455/414.1 |
| 2011/0283305 A1* | 11/2011 | Davis | H04N 21/4367 | 725/9 |
| 2011/0283306 A1* | 11/2011 | Davis | H04N 21/43637 | 725/9 |
| 2011/0283310 A1* | 11/2011 | Davis | H04N 21/23418 | 455/414.1 |
| 2011/0283319 A1* | 11/2011 | Davis | H04N 21/2665 | 725/39 |
| 2011/0283328 A1* | 11/2011 | Davis | H04N 21/4334 | 725/62 |
| 2011/0283329 A1* | 11/2011 | Davis | H04N 21/8126 | 725/62 |
| 2013/0052939 A1* | 2/2013 | Anniballi | H04H 60/56 | 455/3.01 |
| 2013/0167173 A1* | 6/2013 | Davis | H04N 21/4532 | 725/37 |
| 2013/0347016 A1* | 12/2013 | Rowe | H04N 21/25866 | 725/13 |
| 2014/0026158 A1* | 1/2014 | Rowe | H04N 21/42218 | 725/18 |
| 2014/0082651 A1* | 3/2014 | Sharifi | H04N 21/84 | 725/20 |
| 2017/0132774 A1* | 5/2017 | Ruprecht | H04N 17/002 | |
| 2017/0201744 A1* | 7/2017 | Wong | G06T 7/80 | |
| 2020/0132440 A1* | 4/2020 | Liu | G02B 27/62 | |
| 2022/0006931 A1* | 1/2022 | Tobaly | H04N 17/002 | |
| 2022/0414930 A1* | 12/2022 | Muhassin | G02B 27/42 | |
| 2024/0112370 A1* | 4/2024 | Jia | G06T 7/80 | |
| 2024/0357073 A1* | 10/2024 | Thomas | G06T 7/80 | |

FOREIGN PATENT DOCUMENTS

| | | |
|---|---|---|
| JP | 2019-90755 A | 6/2019 |
| WO | 2021024612 A1 | 2/2021 |

* cited by examiner

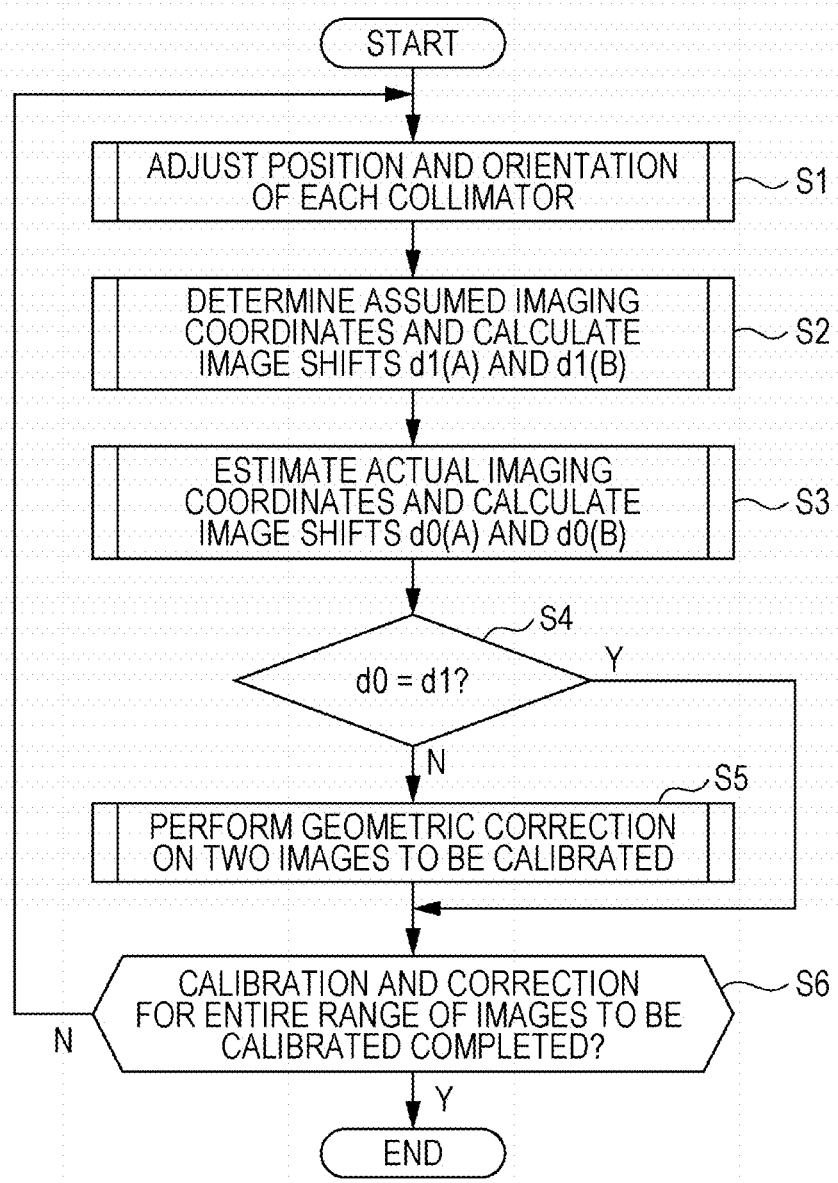

CAMERA UNIT CALIBRATING APPARATUS AND CALIBRATING METHOD

CROSS-REFERENCE TO RELATED APPLICATIONS

The present application claims priority from Japanese Patent Application No. 2023-083896 filed on May 22, 2023, the entire contents of which are hereby incorporated by reference.

BACKGROUND

The disclosure relates to a camera unit calibrating apparatus and a camera unit calibrating method that perform a predetermined measurement on the basis of images acquired by imaging the same object from different viewpoints by using cameras.

There are camera units that include cameras and are configured to image substantially the same predetermined range, including an object, from different viewpoints by using the cameras, and perform image processing on the basis of data of the acquired images to make various measurements or generate various images. Various types of such camera units have been proposed and widely used in practice.

For example, a technique has been widely used in which, in a camera unit including two cameras horizontally arranged side by side with a predetermined distance therebetween, a distance to an object is calculated by using parallax information or a position of the object on screen is calculated, on the basis of data of two images acquired by imaging the object.

When a camera unit of this type is installed and used at a predetermined location, for example, a case covering the entire camera unit may be used for the purpose of protecting the camera unit.

When the camera unit is used in this manner, a window member formed by using a substantially clear and colorless plate-like optical member made of, for example, glass or acrylic may be installed in the case to ensure visibility of the area in front of the camera unit.

Examples of the camera unit include one that is mounted inside a vehicle, such as an automobile, and configured to acquire image data of external conditions around (mainly in front of) the vehicle. In the application of a vehicle-mounted camera unit of this type, for example, a windshield of the vehicle is disposed in a region between an imaging lens of the camera unit and an object to be imaged (hereinafter referred to as an imaging object). This means that the camera unit acquires images of the imaging object through the windshield.

Generally, when an image is acquired by an imaging operation, with an optical member (e.g., windshield) disposed between an imaging lens of a camera unit and an imaging object, for example, a light flux from the object may be affected by optical refraction as it passes through the windshield. This may cause a negative effect, such as a geometric distortion, in the image.

As described above, when an image acquired by the camera unit has a geometric distortion, accurate parallax information cannot be obtained. Since a computational result (e.g., distance to the object) obtained on the basis of inaccurate parallax information contains an error, an accurate measurement cannot be made. To obtain an accurate computational result by using the camera unit, accurate information is to be always acquired.

There have been techniques in which a geometric distortion in an image acquired by a camera unit is measured and image correction is performed on the basis of the measurement result. Examples of the technique that measures a geometric distortion in an acquired image include one in which a geometric distortion caused by the presence of, for example, a windshield is measured by imaging an object, such as a chart board, placed at infinity. However, it is difficult to implement such a technique, as it is known to use a large space.

As examples of the technique that generates images of a chart placed at infinity, techniques using a device, such as a collimator, are disclosed in International Patent Application Publication WO 2021/024612 A1, Japanese Unexamined Patent Application Publication (JP-A) No. 2012-132739, and JP-A No. 2019-90755.

The technique disclosed in International Patent Application Publication WO 2021/024612 A1 uses a collimator, a chart board at a finite distance, and a chart at an infinite distance to correct an image shift created between two cameras of a camera unit mounted in a vehicle.

The techniques disclosed in JP-A No. 2012-132739 and JP-A No. 2019-90755 both use a collimator to generate chart images at an infinite distance and correct an image shift between two cameras of a camera unit in the horizontal direction or the optical axis direction.

SUMMARY

An aspect of the disclosure provides a camera unit calibrating apparatus configured to be applied to a camera unit and to perform a predetermined measurement based on images acquired by imaging the same object from different viewpoints by using cameras of the camera unit. The camera unit calibrating apparatus includes a collimator unit and a control unit. The collimator unit includes collimators corresponding the cameras respectively, collimator driving devices corresponding to the collimators respectively, a support unit configured to support the collimators in such a way as to allow the collimators to be translated individually within a predetermined plane, and a collimator control unit configured to control the collimators and the collimator driving devices. The control unit is configured to control the collimator unit. The control unit is configured to control each of the collimator driving devices to individually set a corresponding one of the collimators to a predetermined position and orientation, and cause each of collimated images produced by the collimators to be formed at a desired position within a range of an imaging area of a corresponding one of the cameras.

An aspect of the disclosure provides a camera unit calibrating method for performing a predetermined measurement based on images acquired by imaging the same object from different viewpoints by using cameras of a camera unit. The camera unit calibrating method includes: controlling each of collimator driving devices to individually set a corresponding one of the collimators to a predetermined position and orientation; causing each of collimated images produced by the collimators to be formed at a desired position within a range of an imaging area of a corresponding one of the cameras; determining, based on setting information of the collimators, an assumed imaging coordinate of each of the collimated images in a corresponding one of reference images, and calculating image shifts in the assumed imaging coordinates; estimating an actual imaging coordinate of each of the collimated images formed in the imaging area of the corresponding one of the cameras, and calculating image shifts in the actual imaging coordinates; performing a calibration process that compares an image shift in the assumed imaging coordinate with an image shift in the actual imaging coordinate; and performing an image correction process that corrects a geometric distortion in an actual image to make the image shift in the actual imaging coordinate equal to the image shift in the assumed imaging coordinate.

An aspect of the disclosure provides a camera unit calibrating apparatus configured to be applied to a camera unit and to perform a predetermined measurement based on images acquired by imaging the same object from different viewpoints by using cameras of the camera unit. The camera unit calibrating apparatus includes a collimator unit and circuitry. The collimator unit includes collimators corresponding the cameras respectively, collimator driving devices corresponding to the collimators respectively, and a support unit configured to support the collimators in such a way as to allow the collimators to be translated individually within a predetermined plane. The circuitry is configured to control the collimator unit. The circuitry is configured to control each of the collimator driving devices to individually set a corresponding one of the collimators to a predetermined position and orientation, and cause each of collimated images produced by the collimators to be formed at a desired position within a range of an imaging area of a corresponding one of the cameras.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 6 is a flowchart illustrating a general operation of the calibrating apparatus according to the embodiment of the disclosure.

DETAILED DESCRIPTION

Figure 1:
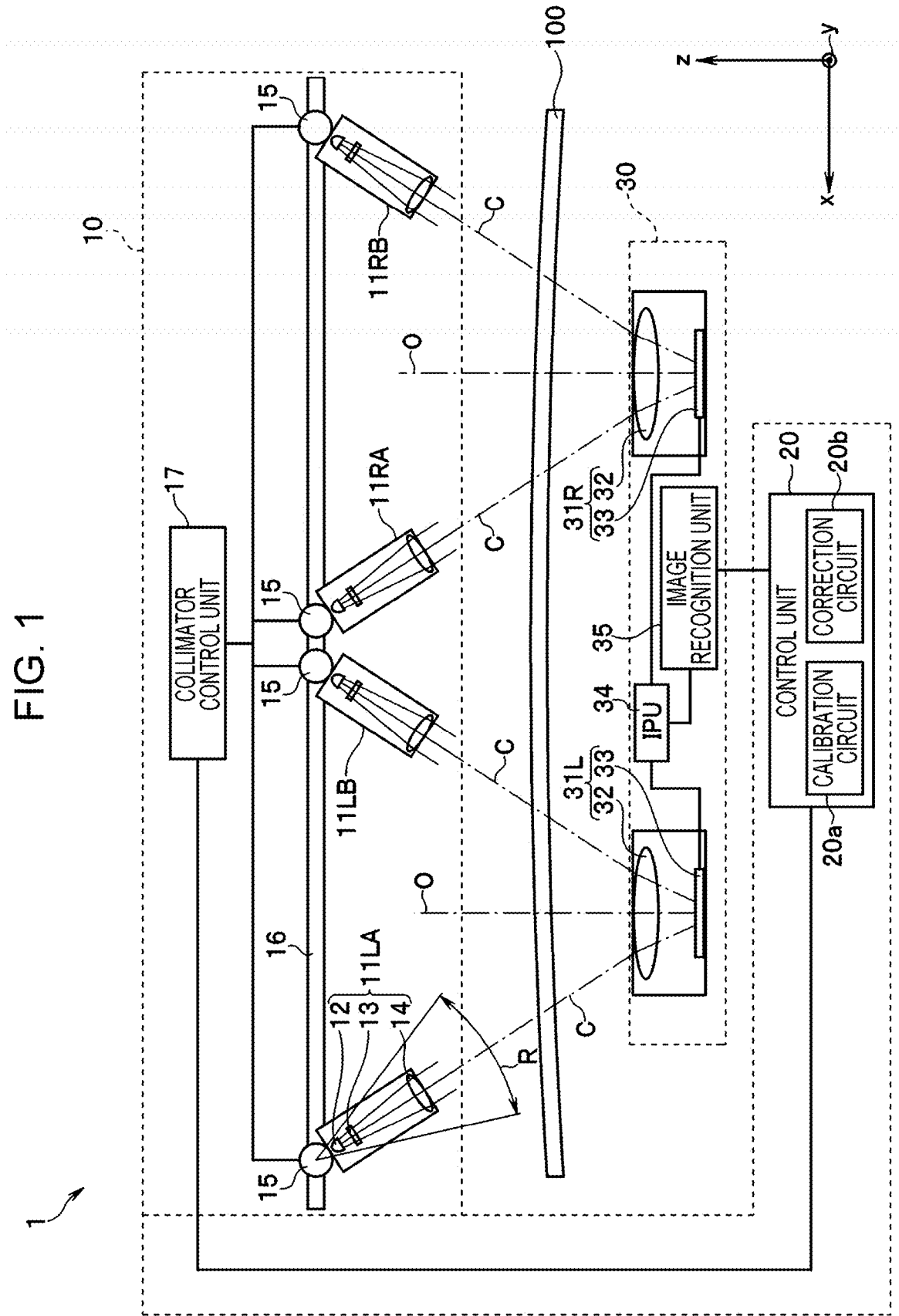
FIG. 1 is a block diagram illustrating a general configuration of a camera unit calibrating apparatus according to an embodiment of the disclosure.

The techniques disclosed in International Patent Application Publication WO 2021/024612 A1, JP-A No. 2012-132739, and JP-A No. 2019-90755 all have a configuration in which the collimator is secured in place with respect to the camera unit.

Therefore, an image formed by the collimator (hereinafter referred to as a collimated image) appears in a predetermined region within the range of an image acquired by the camera unit. Thus, since there is an image region where the collimated image does not appear, a distortion in that region cannot be corrected.

To solve this problem, for example, JP-A No. 2012-132739 discloses a technique in which the diameter of the collimator is increased to allow the collimated image to appear particularly even at the edge of the image range.

However, increasing the diameter of the collimator is not realistic in that it leads to increased size and price of the entire apparatus including the collimator.

In particular, in recent years, the imaging angle of view of cameras used in a vehicle-mounted camera unit has been increasingly wider. To reliably perform distortion correction over the entire range of a wide-angle image acquired by the camera unit, the diameter of the collimator is to be further increased.

It is desirable to provide a camera unit calibrating apparatus and a camera unit calibrating method that perform a predetermined measurement on the basis of images acquired by imaging the same object from different viewpoints by using cameras of a camera unit, and in particular, a camera unit calibrating apparatus and a camera unit calibrating method that can highly accurately measure (calibrate) and correct geometric distortions in images acquired by imaging an object placed at infinity, over the entire range of the acquired images, in a space-saving manner without taking much space.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description of the present embodiment, the term "calibration" refers to comparing, for example, an image shift in the position (actual imaging coordinate) of an object's image in each of images (referred to as actual images) acquired by cameras included in a vehicle-mounted camera unit to be calibrated, with an image shift in the assumed imaging position (assumed imaging coordinate) of an object's image in each of reference images (described below) to obtain the difference between them.

In the following description, the term "correction" refers to, for example, performing predetermined image processing based on the result of the above-described calibration on the data of actual images acquired by cameras included in the camera unit to be calibrated to correct geometric distortion of an object in the image.

First, a general configuration of a camera unit calibrating apparatus according to an embodiment of the disclosure will be described using FIG. 1. FIG. 1 is a block diagram illustrating a general configuration of a camera unit calibrating apparatus according to an embodiment of the disclosure.

Note that arrows x, y, and z in FIG. 1 represent three axes orthogonal to each other in the space. The x axis is in a horizontal direction in a plane parallel to the drawing of FIG. 1, and represents a straight line orthogonal to the y axis and the z axis. The y axis is in a direction orthogonal to the drawing of FIG. 1, and represents a straight line orthogonal to the x axis and the z axis. The z axis is in a vertical direction in a plane parallel to the drawing of FIG. 1, and represents a straight line orthogonal to the x axis and the y axis.

As illustrated in FIG. 1, a calibrating apparatus 1 according to the present embodiment is mainly composed of a collimator unit 10 and a control unit 20.

FIG. 1 conceptually illustrates the calibrating apparatus 1 of the present embodiment installed with respect to a vehicle in which a camera unit 30 to be calibrated is mounted.

In FIG. 1, reference sign 30 denotes a camera unit to be calibrated. The camera unit 30 described as an example in the present embodiment is a so-called stereo camera unit that includes two cameras (31L and 31R) arranged side by side, with a predetermined distance therebetween, in the horizontal direction. The configuration of the camera unit 30 will be described later on below.

In FIG. 1, reference sign 100 denotes a windshield or the like of a vehicle (not illustrated), such as an automobile, in which the camera unit 30 to be calibrated is mounted. The windshield or the like 100 is constituted by a plate-like optical member. The windshield or the like 100 will be described later on below.

As illustrated in FIG. 1, the collimator unit 10 is mainly composed of collimators (11LA, 11LB, 11RA, and 11RB), collimator driving devices 15, a support unit 16, and a collimator control unit 17.

As many collimators (11LA, 11LB, 11RA, and 11RB) as necessary are each installed to correspond to one of the two cameras (31L and 31R, described below) included in the camera unit 30 to be calibrated.

In the present embodiment, the collimator unit 10 includes four collimators, including two collimators (a first collimator 11LA and a second collimator 11LB) corresponding to a left camera (first camera 31L) of the two cameras (31L and 31R) of the camera unit 30, and two collimators (a third collimator 11RA and a fourth collimator 11RB) corresponding to a right camera (second camera 31R) of the two cameras (31L and 31R) of the camera unit 30.

Of the two collimators corresponding to the first camera 31L, the first collimator 11LA forms a collimated image at a predetermined position primarily on the left half of an image acquired by the first camera 31L. Similarly, the second collimator 11LB forms a collimated image at a predetermined position primarily on the right half of the image acquired by the first camera 31L.

Of the two collimators corresponding to the second camera 31R, the third collimator 11RA forms a collimated image at a predetermined position primarily on the left half of an image acquired by the second camera 31R. Similarly, the fourth collimator 11RB forms a collimated image at a predetermined position primarily on the right half of the image acquired by the second camera 31R.

In the following description, reference characters "L" and "R" added to reference numerals following the component names are reference signs that specify "left" and "right", respectively. To describe components without specifying left and right, the reference characters "L" and "R" may be omitted and reference numerals may be used in the description.

For components that are alike, reference characters, such as "A" and "B", are added to reference numerals denoting the components to each indicate a specific one. Again, the reference characters may be omitted in the description except when one specific component is to be indicated.

For example, the collimators, which are the first collimator 11LA, the second collimator 11LB, the third collimator 11RA, and the fourth collimator 11RB, may be simply described as the collimators 11 when no specific collimator is indicated.

The collimators 11 are each configured as described below. The basic configuration of the collimators 11 is substantially the same as that of known collimators. The configuration of the collimators 11 will therefore be briefly described.

The collimators 11 each include, for example, a light source 12, a chart board 13, and a collimator lens 14. The collimator 11 is a device that is configured to generate and emit a collimated light flux (collimated beam) by causing a light flux (diffused light) emitted from the light source 12 to pass through the collimator lens 14.

The chart board 13 is disposed between the light source 12 and the collimator lens 14 and at the focal position of the collimator lens 14. This chart board 13 is, for example, a board member having a predetermined graphic pattern. This chart board 13 is a plate-like member configured to transmit or reflect a light flux to form a predetermined pattern image in a predetermined imaging plane. The chart board 13 assumed to be used in the collimators 11 included in the calibrating apparatus 1 of the present embodiment is, for example, a transmissive chart board.

In the collimator 11 configured as described above, a light flux emitted from the light source 12 passes through the chart board 13 to form a chart image of a predetermined graphic pattern. The light flux forming the chart image is collimated by and emitted from the collimator lens 14. The light emitted here is referred to as a collimated beam. In FIG. 1, reference sign C denotes the optical axis of the collimated beam. The chart image formed by the collimated beam can be treated as being equivalent to, for example, an image of an object placed at infinity.

The collimator driving device 15 is a driving source coupled to the proximal end of each collimator 11 and configured to drive the collimator 11. The collimator driving device 15 is configured to adjust the direction of the collimated beam C emitted from the collimator 11. The collimator driving device 15 is configured to cause the collimator 11 to pivot about the proximal end of the collimator 11 within a predetermined range denoted by reference sign R (see FIG. 1) in a direction along a plane containing the x axis. Although not illustrated in FIG. 1, the collimator driving device 15 is also configured to cause the collimator 11 to pivot in a direction along a plane containing the y axis within a predetermined range similar to that in the x axis direction.

The collimator driving devices 15 and the collimators 11 are configured to be capable of being translated in the x axis direction and the y axis direction, that is, in the xz plane and the xy plane in FIG. 1.

The support unit 16 is configured to support the collimator driving devices 15 and allow the collimator driving devices 15 and the collimators 11 to be translated in the xz plane and the xy plane.

The collimator control unit 17 is a constituent unit or an electronic circuit configured to control the collimators 11 and the collimator driving devices 15 under control of the control unit 20. The collimator control unit 17 is configured to control ON and OFF of each collimator 11 and regulate the amount of light from the collimator 11. The collimator control unit 17 is also configured to control each of the collimator driving devices 15 to adjust the position and orientation of a corresponding one of the collimators 11. This adjustment allows a collimated image from each collimator 11 to be formed at a desired position within the range of the imaging area (within the entire range of the acquired image) in each of the two cameras 31 of the camera unit 30.

The control unit 20 is a constituent unit or an electronic circuit configured to control the overall operation of the calibrating apparatus 1. The control unit 20 is coupled to the collimator unit 10 and configured to control the collimator unit 10. The control unit 20 is also coupled to an image recognition unit 35 (described below) in the camera unit 30 to be calibrated.

The control unit 20 includes a calibration circuit 20a and a correction circuit 20b. The calibration circuit 20a is a constituent unit or an electronic circuit configured to perform a predetermined calibration process, and the correction circuit 20b is a constituent unit or an electronic circuit configured to perform a predetermined correction process.

The calibration circuit 20a receives data of an image acquired by the camera unit 30 to be calibrated, and determines the position (actual imaging coordinate) of an object's image (collimated image) in the acquired image. The calibration circuit 20a also receives setting information (such as position and orientation) from each of the collimators 11 and determines an assumed imaging position (assumed imaging coordinate) of the object's image (collimated image) corresponding to the setting information. The calibration circuit 20a then compares the actual imaging coordinate with the assumed imaging coordinate and performs a calibration process that measures an image shift.

On the basis of the result of the calibration process, the correction circuit 20b performs a predetermined image correction process (such as correction of geometric distortion in the object's image) on data of actual images acquired by the camera unit 30 to be calibrated.

The configuration of the calibrating apparatus 1 according to the present embodiment is as described above.

The camera unit 30 to be calibrated by the calibrating apparatus 1 of the present embodiment is configured as a so-called stereo camera unit, as described above. Accordingly, as illustrated in FIG. 1, the camera unit 30 is mainly composed of the two cameras 31, an image processing unit (IPU) 34, and the image recognition unit 35.

The two cameras 31 include a first camera 31L (left camera) and a second camera 31R (right camera). The first camera 31L and the second camera 31R are arranged side by side, with a predetermined distance therebetween, in the horizontal direction. The two cameras 31 are disposed, with the optical axes θ (see FIG. 1) thereof being substantially parallel to each other.

The basic configuration of the cameras 31 is substantially the same as that of known cameras. The configuration of the cameras 31 will therefore be briefly described.

The cameras 31 are each mainly composed of an imaging lens 32, an imaging element 33, and an imaging substrate (not illustrated). The imaging lens 32 is constituted, for example, by an optical lens configured to form an optical image of an object. The imaging element 33 is a photoelectric conversion element configured to receive an optical image formed by the imaging lens 32 and generate and output an electrical image signal. For example, a charge-coupled device (CCD) image sensor or a complementary metal-oxide-semiconductor (CMOS) image sensor is used as the imaging element 33. Generally, the imaging element 33 is mounted on the imaging substrate (not illustrated) on which, for example, a predetermined imaging circuit is mounted.

The image processing unit (hereinafter referred to as IPU) 34 is a constituent unit or an electronic circuit configured to perform predetermined image processing on image data acquired by the cameras 31 and perform image processing, such as edge detection, on an object within an image range. The IPU 34 is also configured to acquire range information from the amount of positional shift between corresponding edges of right and left images, and perform processing that generates image information including the range information (range image information).

The image recognition unit 35 is configured to determine various types of information, such as the curvature (1/m) of right and left traffic lines of a path along which the vehicle travels and the width (lane width) between the right and left traffic lines on the basis of, for example, the range image information received from the IPU 34.

The image recognition unit 35 is also configured to perform, for example, predetermined pattern matching on the range image information to recognize, for example, various three-dimensional objects on the road and road surface conditions. Recognizing three-dimensional objects involves recognizing, for example, the type of the three-dimensional object, the height of the three-dimensional object, the distance to the three-dimensional object, the speed of the three-dimensional object, the relative speed of the three-dimensional object to the vehicle, and the relative distance between three-dimensional objects.

The camera unit 30 configured as described above uses the two cameras 31 to image a predetermined range of conditions in front, including the same object, from different viewpoints at substantially the same time in predetermined imaging cycles synchronized with each other, and acquire data of the two images to generate a stereo image.

The windshield or the like 100 is a plate-like optical member included in the vehicle (not illustrated), such as an automobile, in which the camera unit 30 to be calibrated is mounted. The windshield or the like 100 corresponds to a so-called front window glass.

The windshield or the like 100 is made of a substantially clear and colorless material, such as glass or acrylic, and has a complex curved surface. The windshield or the like 100 is disposed between the camera unit 30 to be calibrated and an object (corresponding to collimated images formed by the collimators 11 in the present embodiment), and in the area in front of the imaging lenses 32 of the camera unit 30.

All or some of, for example, the control unit 20, the calibration circuit 20a, the correction circuit 20b, and the collimator control unit 17 are each constituted by a processor including hardware. The same applies to, for example, the IPU 34 and the image recognition unit 35 included in the camera unit 30.

Here, the processor is constituted by a known structure including a central processing unit (CPU), a random-access memory (RAM), a read-only memory (ROM), a non-volatile memory, a non-volatile storage, and a non-transitory recording medium (or non-transitory computer readable medium), and its peripherals.

Software programs executed by the CPU and fixed data, such as data tables, are stored, for example, in the ROM, the non-volatile memory, and the non-volatile storage in advance. The function of each of the constituent parts or units described above is implemented by the CPU reading a software program stored, for example, in the ROM and expanding and executing the read software program in the RAM, or is implemented by the software program appropriately referring to, for example, various types of data.

The processor may be constituted by a semiconductor chip, such as a field programmable gate array (FPGA). The constituent parts or units may each be constituted by an electronic circuit.

All or some of the software programs may be recorded, as computer program products, on a portable disk medium, such as a flexible disk, a CD-ROM, or a DVD-ROM, or a non-transitory storage medium (non-transitory computer readable medium), such as a card memory, a hard disk drive (HDD), or a solid-state drive (SSD).

In the calibrating apparatus 1 of the present embodiment configured as described above, the positions and orientations of the collimators 11 of the collimator unit 10 can be adjusted to any values at desired timing. That is, the collimated beams C from the collimators 11 can be set non-parallel to the optical axis O of each of the two cameras 31 of the camera unit 30. With this configuration, a collimated image can be formed at a desired position within the entire range of each of images acquired by the cameras 31.

Although the collimator unit 10 includes four collimators 11 in the present embodiment, the number of the collimators 11 installed is not limited to this.

In the exemplary configuration illustrated in FIG. 1, two collimators (11LA and 11LB) are provided to correspond to the first camera 31L, and two collimators (11RA and 11RB) are provided to correspond to the second camera 31R. This configuration is advantageous in that it can contribute to the increased speed of a calibration process, as the calibration process can be carried out simultaneously at two points.

The exemplary configuration described above may be replaced by one in which, for example, the first camera 31L and the second camera 31R are each provided with one collimator. With this configuration, where a calibration process is performed at one point at a time, it takes more processing time than with the configuration of the embodiment described above (i.e., configuration with four collimators). However, this configuration can contribute to reduced cost of the entire apparatus, as it can reduce the number of collimators 11 installed while maintaining the effect of being capable of performing the calibration process over the entire range of the image.

The operation of the calibrating apparatus 1 according to the present embodiment, configured as described above, will now be described. First, a basic idea of the calibration process performed by the calibrating apparatus 1 of the present embodiment will be described using FIG. 2 and FIG. 3.

Figure 2:
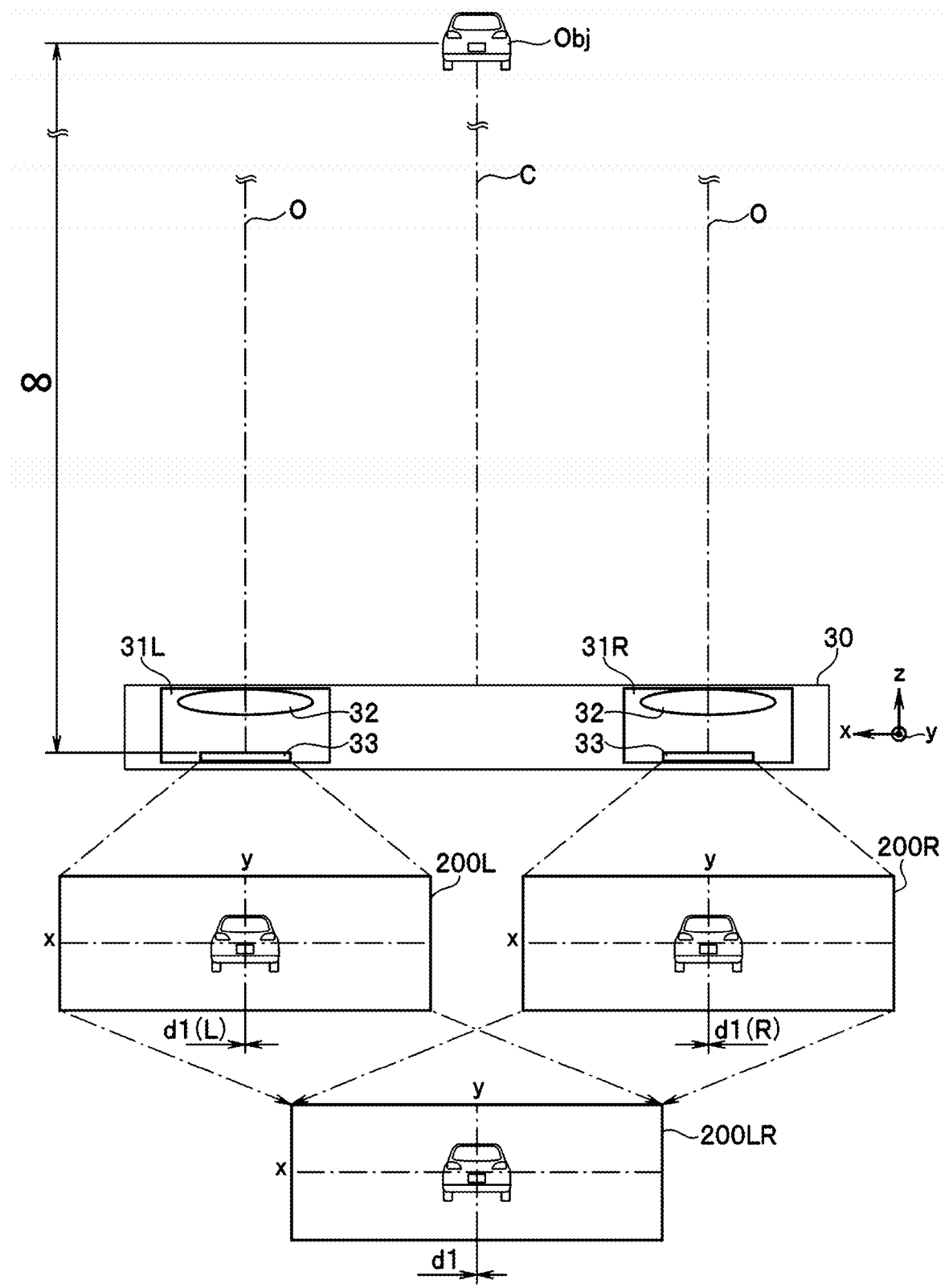
FIG. 2 is a conceptual diagram schematically illustrating how an object placed at infinity is imaged with a camera unit, and images acquired at that time (reference images acquired in normal imaging)
Figure 3:
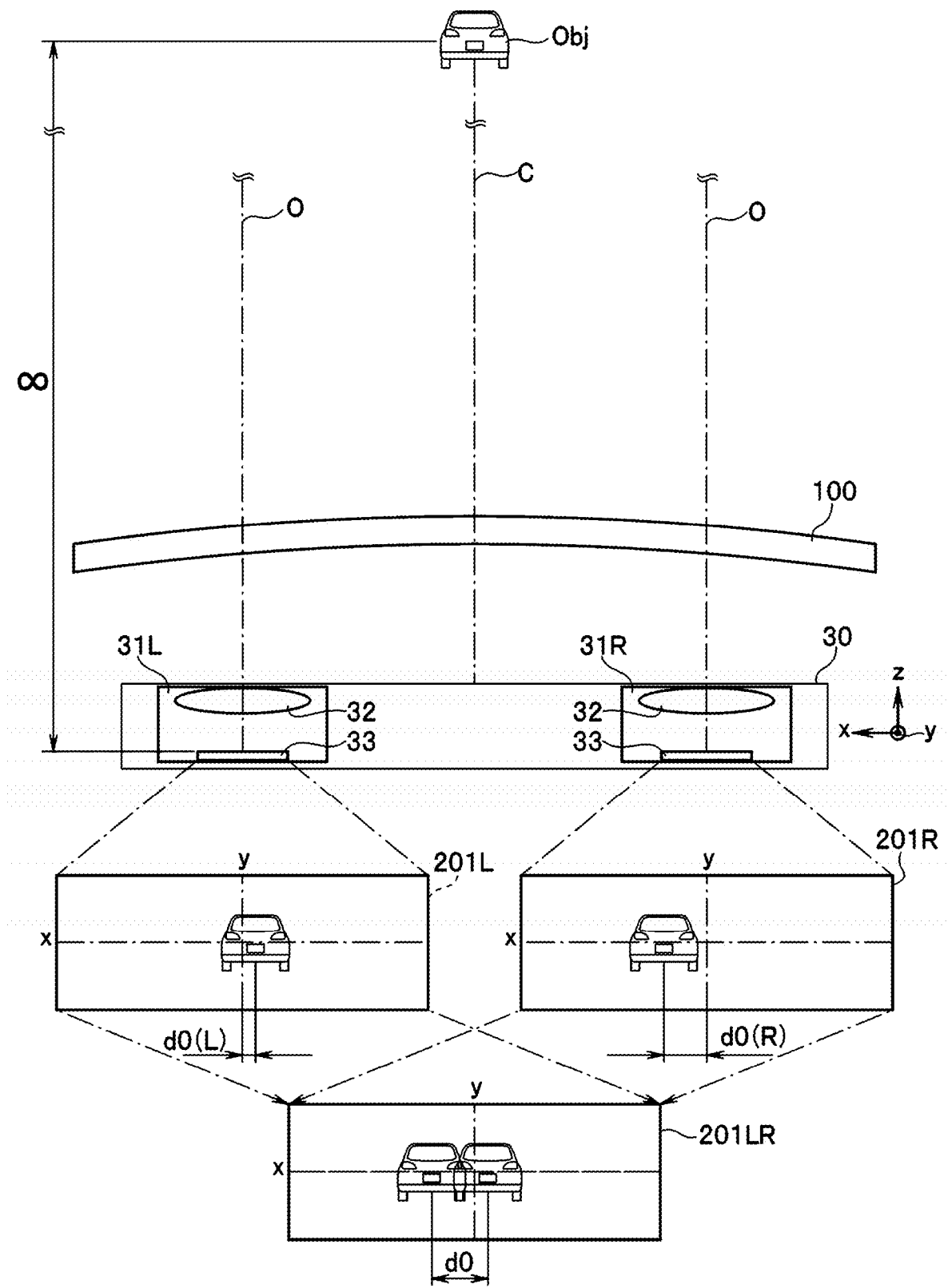
FIG. 3 is a conceptual diagram schematically illustrating how an object placed at infinity is imaged with the camera unit, and images acquired at that time (images to be calibrated)

FIG. 2 and FIG. 3 are conceptual diagrams schematically illustrating how an object placed at infinity is imaged with the camera unit, and images acquired at that time. FIG. 2 illustrates how normal imaging is performed with the camera unit and images acquired at that time (reference images). FIG. 3 illustrates how imaging through the windshield is performed with the camera unit and images acquired at that time (images to be calibrated). The normal imaging illustrated in FIG. 2 refers to imaging performed in the absence of the windshield, whereas the imaging illustrated in FIG. 3 refers to imaging performed through the windshield.

In the examples illustrated in FIG. 2 and FIG. 3, reference sign Obj denotes an imaging object. Although the imaging object Obj is represented by a given form of an object (e.g. vehicle) in the examples illustrated in FIG. 2 and FIG. 3, the imaging object Obj is not limited to that in the illustrated examples. The imaging object Obj may be, for example, a chart formed by a predetermined graphic pattern.

The imaging object Obj is assumed to be placed at a position directly facing the imaging lenses 32 of the two cameras 31 of the camera unit 30 and substantially at infinity. Here, the imaging object Obj is assumed to be a collimated image formed by a collimator (not illustrated).

The optical axes O of the two cameras 31 of the camera unit 30 are thus parallel to the collimated beam C that forms the imaging object Obj as a collimated image.

That is, the state in which the imaging object Obj directly faces the two cameras 31 of the camera unit 30 means that the direction of the optical axes O of the imaging lenses 32 of the two cameras 31 coincides with that of the light flux (collimated beam C) from the imaging object Obj.

When the imaging object Obj directly faces the camera unit 30, two images acquired by the two cameras 31 of the camera unit 30 are those denoted by reference signs 200L and 200R in FIG. 2. Reference sign 200L denotes a left image acquired by the first camera (left camera) 31L. Reference sign 200R denotes a right image acquired by the second camera (right camera) 31R.

In the two images 200, an object's image (collimated image) is formed at substantially the center of each image. Reference sign d1(L) in FIG. 2 denotes an image shift (assumed imaging coordinate) of the object's image (collimated image) from the center position of the left image 200L. Similarly, reference sign d1(R) in FIG. 2 denotes an image shift (assumed imaging coordinate) of the object's image (collimated image) from the center position of the right image 200R.

In the xy plane of the image plane (i.e., imaging area), an image shift may occur in the x axis direction and the y axis direction. However, in the image shifts d1(L) and d1(R) of the present embodiment, an image shift in the x axis direction is taken into consideration.

That is, an image shift in the x axis direction affects accuracy of parallax information, and this may affect accuracy of distance measurement. Therefore, the present embodiment focuses on an image shift in the x axis direction, and intends to calibrate and correct the image shift in the x axis direction.

The image shifts d1(L) and d1(R) can be represented by coordinates on the x axis (shift on the y axis is ignored). The image shift is expressed in pixels that form an image.

Superimposing the two images 200 produces an image denoted by reference sign 200LR in FIG. 2. Reference sign d1 in FIG. 2 denotes an image shift created between the object's image in the left image 200L and the object's image in the right image 200R.

Here, the image shift d1 can be expressed as a difference between the image shift d1(L) in the left image 200L and the image shift d1(R) in the right image 200R. That is, the image shift d1 can be expressed as d1=d1(L)−d1(R). In this case, the image shift d1 is parallax created between the two images 200.

Generally, in normal imaging of the imaging object Obj directly facing the camera unit 30 and placed at infinity, the image shift (parallax) d1 in the two images 200 is basically zero (d1=0).

In the normal imaging illustrated in FIG. 2, there is no windshield or the like (described below) between the camera unit 30 and the imaging object Obj. The images acquired in this state are referred to as reference images (200L and 200R). It is desirable that the parallax in the reference images 200 be zero.

In FIG. 3, on the other hand, imaging is performed with the camera unit 30 mounted in the vehicle (not illustrated). In the example illustrated in FIG. 3, the imaging object Obj is also assumed to be placed at a position directly facing the imaging lenses 32 of the two cameras 31 of the camera unit 30 and substantially at infinity, as in the example illustrated in FIG. 2. Again, the imaging object Obj is assumed to be a collimated image.

Reference sign 100 illustrated in FIG. 3 denotes a windshield or the like of a vehicle. The windshield or the like 100 is assumed to be present between the camera unit 30 and the imaging object Obj. Images acquired in this state are referred to as images to be calibrated. The images to be calibrated are also referred to as actual images, as they are images based on actual image data acquired by the camera unit 30 to be calibrated.

When imaging is performed, with the camera unit 30 and the imaging object Obj directly facing each other, as illustrated in FIG. 3, the image of the imaging object Obj may be distorted by the presence of an optical member, such as the windshield or the like 100, between the camera unit 30 and the imaging object Obj.

In FIG. 3, reference signs 201L and 201R denote examples of two images acquired by the two cameras 31 of the camera unit 30. Here, reference sign 201L denotes an actual image of the left image (left actual image) acquired by the first camera (left camera) 31L, and reference sign 201R denotes an actual image of the right image (right actual image) acquired by the second camera (right camera) 31R.

In the two actual images 201, the object's image (collimated image) is formed off a point substantially in the center of each image. This indicates that the image formed is distorted, for example, by the presence of the windshield or the like 100.

Reference sign d0(L) in FIG. 3 denotes an image shift (actual imaging coordinate) of the object's image (collimated image) from the center position of the left actual image 201L. Similarly, reference sign d0(R) in FIG. 3 denotes an image shift (actual imaging coordinate) of the object's image (collimated image) from the center position of the right image 200R.

Superimposing the two actual images 201 produces an image denoted by reference sign 201LR in FIG. 3. Reference sign do in FIG. 3 denotes an image shift created between the object's image in the left actual image 201L and the object's image in the right actual image 201R.

Here, the image shift do in FIG. 3 can be expressed as a difference between the image shift d0(L) in the left actual image 201L and the image shift d0(R) in the right actual image 201R. That is, the image shift do can be expressed as d0=d0(L)−d0(R). In this case, the image shift do is parallax created between the two images 201.

The image shift do in this case includes image shifts resulting from image distortion caused, for example, by the presence of the windshield or the like 100, as described above. Therefore, the image shift do does not accurately represent the parallax created between the two images 201. This means that if, for example, a computation, such as measurement of the distance to the object, is made on the basis of the image shift do, the result of the measurement will be inaccurate.

Accordingly, the calibrating apparatus 1 of the present embodiment is configured to measure (calibrate) image shifts resulting from image distortion caused by the presence of the windshield or the like 100 between the camera unit 30 and the imaging object Obj and perform a predetermined image correction process.

In the examples illustrated in FIG. 2 and FIG. 3, the camera unit 30 and the imaging object Obj at infinity directly face each other, as described above.

In the calibrating apparatus 1 of the present embodiment, the collimated beams C from the collimators 11 are set non-parallel to the optical axis O of each of the two cameras 31 of the camera unit 30. This allows a collimated image to be formed at a desired position within the entire range of each of the two images acquired by the two cameras 31.

With this configuration, the calibrating apparatus 1 of the present embodiment can perform calibration and correction over the entire range of images acquired by the camera unit 30.

Figure 4:
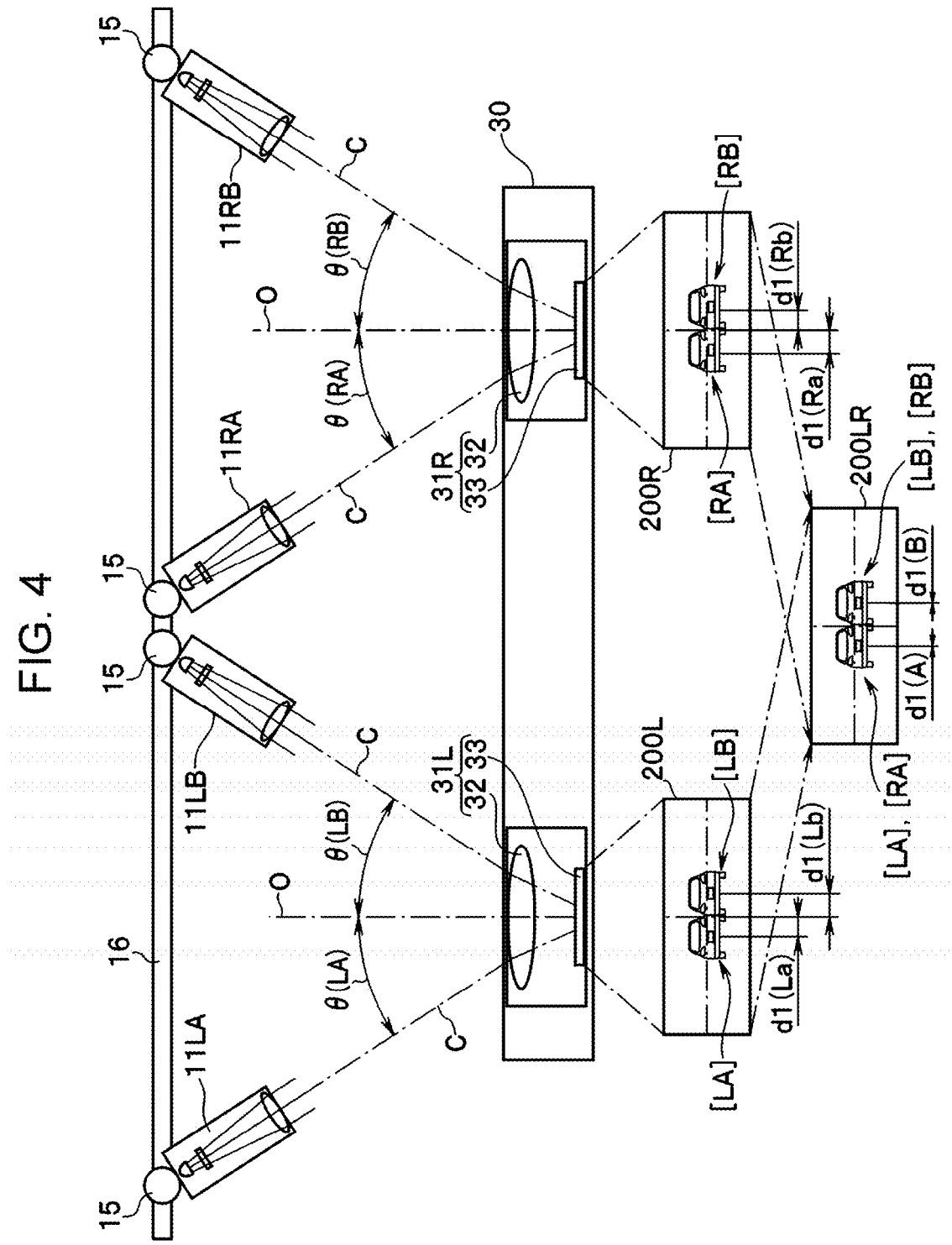
FIG. 4 is a schematic diagram illustrating an operation that determines assumed image shifts in reference images in a calibration process performed using the calibrating apparatus according to the embodiment of the disclosure.
Figure 5:
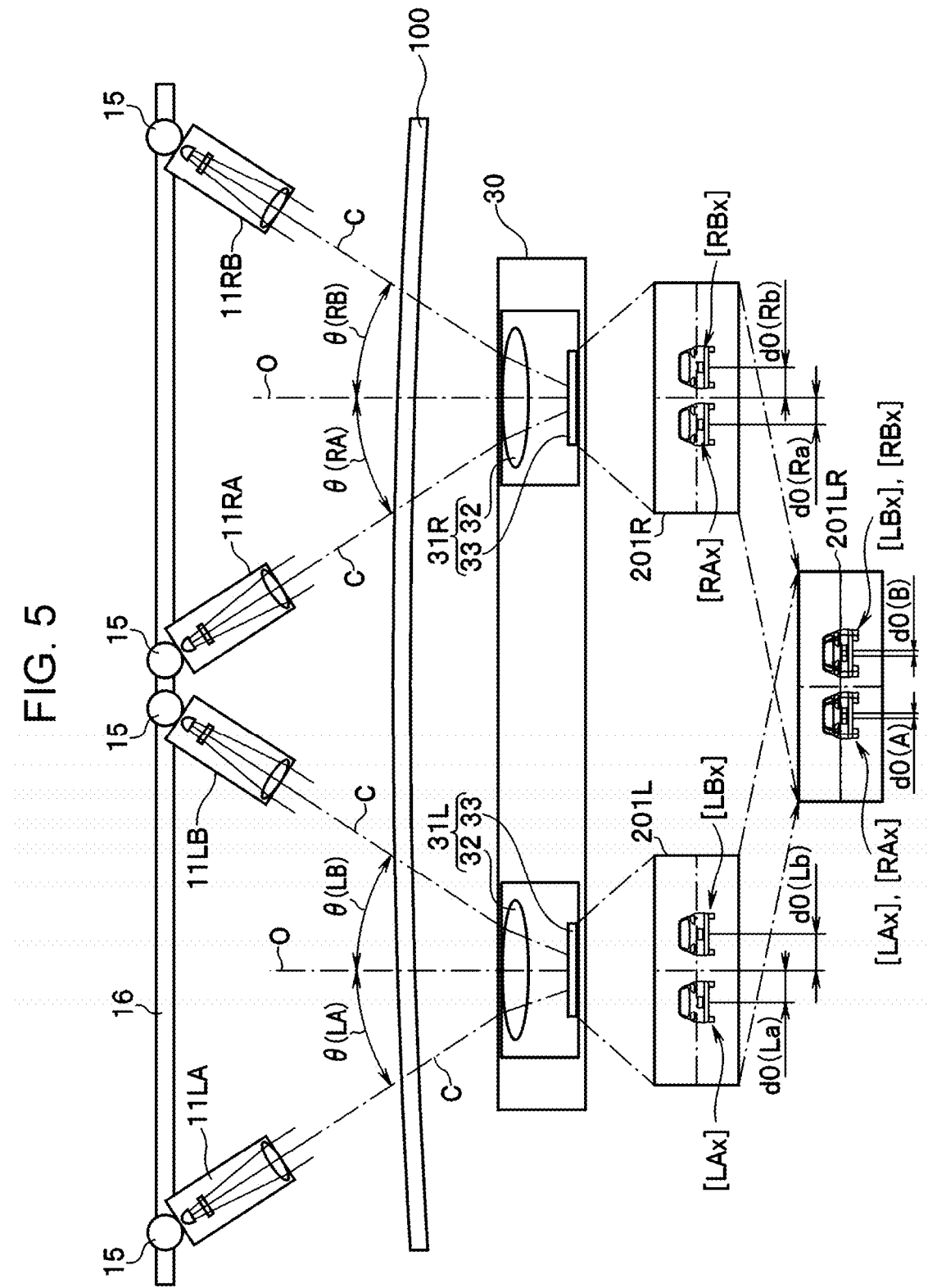
FIG. 5 is a schematic diagram illustrating an operation that determines image shifts in images to be calibrated in the calibration process performed using the calibrating apparatus according to the embodiment of the disclosure.

The operation of the calibrating apparatus 1 according to the present embodiment will now be described using FIG. 4 to FIG. 6. FIG. 4 is a schematic diagram illustrating an operation that determines assumed image shifts in reference images in a calibration process performed using a calibrating apparatus according to the embodiment of the disclosure. FIG. 5 is a schematic diagram illustrating an operation that determines image shifts in images to be calibrated (actual images) in a calibration process performed using the calibrating apparatus according to the embodiment of the disclosure. FIG. 6 is a flowchart illustrating a general operation of the calibrating apparatus according to the embodiment of the disclosure.

First, the calibrating apparatus 1 of the present embodiment is installed at a predetermined position with respect to the vehicle in which the camera unit 30 to be calibrated is mounted. For example, a plate-like optical member corresponding to the windshield or the like 100 is disposed between the camera unit 30 and the collimator unit 10 of the calibrating apparatus 1. In this state, an inspection (calibration and correction processes) using the calibrating apparatus 1 of the present embodiment is performed. FIG. 5 schematically illustrates each of constituent devices in this state.

In step S1 illustrated in FIG. 6, the control unit 20 causes the collimator control unit 17 to control the collimator unit 10 and adjust the position and orientation of each of the collimators 11.

This adjustment is performed to allow a collimated image produced by a collimated beam emitted from each collimator 11 to be formed at a desired position within the range of the imaging plane of the imaging element 33 of each camera 31 of the camera unit 30 to be calibrated.

In other words, this adjustment is performed to allow a collimated image produced by each collimator 11 to be formed at a desired position within the range of each of images acquired by the camera unit 30.

In step S2, for example, on the basis of setting information of each collimator 11 whose position and orientation have been set, the control unit 20 determines assumed imaging coordinates d1(La), d1(Lb), d1(Ra), and d1(Rb) of collimated images assumed in the two reference images 200 illustrated in FIG. 4.

Examples of the setting information of each collimator 11 include angular information θ(LA), θ(LB), θ(RA), and θ(RB) between each of the collimated beams C and a corresponding one of the optical axes O of the cameras 31. The angle θ(LA) is an angle formed by the collimated beam C from the first collimator 11LA and the optical axis O of the first camera 31L. The angle θ(LB) is an angle formed by the collimated beam C from the second collimator 11LB and the optical axis O of the first camera 31L. The angle θ(RA) is an angle formed by the collimated beam C from the third collimator 11RA and the optical axis O of the second camera 31R. The angle θ(RB) is an angle formed by the collimated beam C from the fourth collimator 11RB and the optical axis O of the second camera 31R.

Reference signs [LA], [LB], [RA], and [RB] in FIG. 4 denote four collimated images formed in the two reference images 200. Reference sign [LA] denotes a first collimated image formed on the left image 200L by the first collimator 11LA. Reference sign [LB] denotes a second collimated image formed on the left image 200L by the second collimator 11LB. Reference sign [RA] denotes a third collimated image formed on the right image 200R by the third collimator 11RA. Reference sign [RB] denotes a fourth collimated image formed on the right image 200R by the fourth collimator 11RB.

In FIG. 4, reference sign d1(La) denotes an assumed imaging coordinate of the first collimated image [LA] on the x axis, reference sign d1(Lb) denotes an assumed imaging coordinate of the second collimated image [LB] on the x axis, reference sign d1(Ra) denotes an assumed imaging coordinate of the third collimated image [RA] on the x axis, and reference sign d1(Rb) denotes an assumed imaging coordinate of the fourth collimated image [RB] on the x axis.

Then, on the basis of each of the assumed imaging coordinates d1(La), d1(Lb), d1(Ra), and d1(Rb) determined, image shifts d1(A) and d1(B) of the collimated images [LA], [LB], [RA], and [RB] in the reference image 200LR obtained by superimposing the two reference images 200 are calculated.

Here, the image shift d1(A) is determined as a difference between the assumed imaging coordinate d1(La) of the collimated image [LA] from the first collimator 11LA on the x axis and the assumed imaging coordinate d1(Ra) of the collimated image [RA] from the third collimator 11RA on the x axis. That is, the image shift d1(A) can be expressed as d1(A)=d1(La)−d1(Ra).

The image shift d1(B) is determined as a difference between the assumed imaging coordinate d1(Lb) of the collimated image [LB] from the second collimator 11LB on the x axis and the assumed imaging coordinate d1(Rb) of the collimated image [RB] from the fourth collimator 11RB on the x axis. That is, the image shift d1(B) can be expressed as d1(B)=d1(Lb)−d1(Rb).

In this case, it is basically desirable that the angle $\theta$(LA) related to the first collimator 11LA and the angle $\theta$(RA) related to the third collimator 11RA be equal. The collimated beam C from the first collimator 11LA and the collimated beam C from the third collimator 11RA are substantially parallel.

With the settings described above, the assumed imaging coordinate d1(La) of the collimated image [LA] from the first collimator 11LA on the x axis and the assumed imaging coordinate d1(Ra) of the collimated image [RA] from the third collimator 11RA on the x axis are substantially equal. This can be expressed as d1(La)≈d1(Ra).

Also, it is desirable that the angle $\theta$(LB) related to the second collimator 11LB and the angle $\theta$(RB) related to the fourth collimator 11RB be equal. In this case, the collimated beam C from the second collimator 11LB and the collimated beam C from the fourth collimator 11RB are substantially parallel.

With the settings described above, the assumed imaging coordinate d1(Lb) of the collimated image [LB] from the second collimator 11LB on the x axis and the assumed imaging coordinate d1(Rb) of the collimated image [RB] from the fourth collimator 11RB on the x axis are substantially equal. This can be expressed as d1(Lb)≈d1(Rb).

This means that "image shift d1(A)≈0" and "image shift d1(B)≈0" are true in the reference image 200LR.

The image shifts d1(A) and d1(B) in the reference image 200 each are information that can be defined and assumed in advance by combination of the setting information of each collimator 11 and a corresponding one of the two cameras 31 of the camera unit 30 to be calibrated. Therefore, map information related to the image shifts d1 in the reference image 200 may be created in advance, so that the map can be referred to during execution of the calibration process illustrated in FIG. 6.

Referring back to FIG. 6, in step S3, on the basis of the two actual images 201 (see FIG. 5) acquired by the two cameras 31 of the camera unit 30, the control unit 20 estimates the actual imaging coordinates d0(La), d0(Lb), d0(Ra), and d0(Rb) of the collimated images on the x axis in the two actual images 201.

Reference signs [LAx], [LBx], [RAx], and [RBx] in FIG. 5 denote four collimated images formed in the two actual images 201. Reference sign [LAx] denotes a first collimated image formed on the left actual image 201L by the first collimator 11LA. Reference sign [LBx] denotes a second collimated image formed on the left actual image 201L by the second collimator 11LB. Reference sign [RAx] denotes a third collimated image formed on the right actual image 201R by the third collimator 11RA. Reference sign [RBx] denotes a fourth collimated image formed on the right actual image 201R by the fourth collimator 11RB.

In FIG. 5, reference sign d0(La) denotes an actual imaging coordinate of the first collimated image [LAx] on the x axis, reference sign d0(Lb) denotes an actual imaging coordinate of the second collimated image [LBx] on the x axis, reference sign d0(Ra) denotes an actual imaging coordinate of the third collimated image [RAx] on the x axis, and reference sign d0(Rb) denotes an actual imaging coordinate of the fourth collimated image [RBx] on the x axis.

Then, on the basis of each of the actual imaging coordinates d0(La), d0(Lb), d0(Ra), and d0(Rb) estimated, image shifts d0(A) and d0(B) of the collimated images [LAx], [LBx], [RAx], and [RBx] in the image 201LR obtained by superimposing the two actual images 201 are calculated.

Here, the image shift d0(A) is determined as a difference between the actual imaging coordinate d0(La) of the collimated image [LAx] from the first collimator 11LA on the x axis and the actual imaging coordinate d0(Ra) of the collimated image [RAx] from the third collimator 11RA on the x axis. That is, the image shift d0(A) can be expressed as d0(A)=d0(La)−d0(Ra).

The image shift d0(B) is determined as a difference between the actual imaging coordinate d0(Lb) of the collimated image [LBx] from the second collimator 11LB on the x axis and the actual imaging coordinate d0(Rb) of the collimated image [RBx] from the fourth collimator 11RB on the x axis. That is, the image shift d0(B) can be expressed as d0(B)=d0(Lb)−d0(Rb).

In this case, again, it is basically desirable that the angle $\theta$(LA) related to the first collimator 11LA and the angle $\theta$(RA) related to the third collimator 11RA be equal. The collimated beam C from the first collimator 11LA and the collimated beam C from the third collimator 11RA are substantially parallel.

With the settings described above, the actual imaging coordinate d0(La) of the collimated image [LAx] from the first collimator 11LA on the x axis and the actual imaging coordinate d0(Ra) of the collimated image [RAx] from the third collimator 11RA on the x axis are ideally substantially equal. In practice, however, the actual imaging coordinate d0(La) and the actual imaging coordinate d0(Ra) are not equal (d0(La) #d0(Ra)) due to distortion caused by the presence of the windshield or the like 100, and the predetermined image shift d0(A) is created between them.

It is desirable that the angle $\theta$(LB) related to the second collimator 11LB and the angle $\theta$(RB) related to the fourth collimator 11RB be equal. In this case, the collimated beam C from the second collimator 11LB and the collimated beam C from the fourth collimator 11RB are substantially parallel.

With the settings described above, the actual imaging coordinate d0(Lb) of the collimated image [LBx] from the second collimator 11LB on the x axis and the actual imaging coordinate d0(Rb) of the collimated image [RBx] from the fourth collimator 11RB on the x axis are ideally substantially equal. In practice, however, the actual imaging coordinate d0(Lb) and the actual imaging coordinate d0(Rb) are not equal (d0(Lb)≠d1(Rb)) due to distortion caused by the presence of the windshield or the like 100, and the predetermined image shift d0(B) is created between them.

In step S4 in FIG. 6, the control unit 20 compares the image shift do in actual imaging coordinate and the image shift d1 in assumed imaging coordinate to determine whether they are equal. If the control unit 20 determines that d0=d1 is true, the process proceeds to step S6. If the control unit 20 determines that d0=d1 is not true, the process proceeds to step S5.

In step S5, the control unit 20 causes the correction circuit 20b to perform a predetermined image correction process, including correction of geometric distortion and positioning, on collimated images in the two actual images 201. The image correction process is a correction process that makes each image shift do in actual imaging coordinate equal to the corresponding image shift d1 in assumed imaging coordinate. The image correction process will not be described in detail, as various known correction processes can be used.

In step S6, the control unit 20 determines whether the calibration and correction processes have been completed for the entire range of the two actual images 201 acquired by the two cameras 31. If the control unit 20 determines that the calibration and correction processes have not been completed for the entire range, the process returns to step S1 and all the following steps, including step S1, are repeated. If the control unit 20 determines that the calibration and correction processes have been completed for the entire range, the series of steps ends.

As for the setting information of each collimator 11, for example, minor setting errors caused by internal parameters (e.g., mechanical errors in each collimator driving device 15 or the support unit 16) of the collimator unit 10 may cause an image shift in the assumed position of the collimated image.

In this case, for example, the image shift d1 in the reference image 200 in the x axis direction is not zero, and emerges as a minor image shift. However, the calibrating apparatus 1 of the present embodiment compares and calibrates the image shift d1 in the reference image 200 and the image shift do in the actual image 201 to be calibrated. The calibrating apparatus 1 then performs a geometric image correction process on the actual image 201 on the basis of the result of the calibration.

Therefore, in the present embodiment, the image shift d1 serving as a reference is not necessarily to be strictly set to zero. For the reference image 200, for example, the angle θ(LA) related to the first collimator 11LA and the angle θ(RA) related to the third collimator 11RA may be set to different values, and the collimated beam C from the first collimator 11LA and the collimated beam C from the third collimator 11RA may be set non-parallel.

With the settings described above, the assumed imaging coordinate d1(La) of the collimated image [LA] from the first collimator 11LA on the x axis and the assumed imaging coordinate d1(Ra) of the collimated image [RA] from the third collimator 11RA on the x axis are different. Therefore, the predetermined image shift d1(A) is assumed to occur between them.

Then, with the same settings as above, the actual images 201 are acquired, and the actual imaging coordinate d0(La) of the collimated image [LAx] from the first collimator 11LA on the x axis and the actual imaging coordinate d0(Ra) of the collimated image [RAx] from the third collimator 11RA on the x axis are determined. This is followed by measuring the image shift d0(A) between them, and performing an image correction process that makes the d1(A) and d0(A) equal. This process can produce an appropriate result of image correction.

As described above, in the embodiment, where the collimators 11 are used, an object's image equivalent to that acquired when the object is placed at infinity can be obtained. This can contribute to reduced space for inspection.

By operating the collimators 11 at the same time, measurements at imaging positions can be performed at the same time. This can speed up the process and contribute to reduced time for the inspection.

The collimated beams C from the collimators 11 are set non-parallel to the optical axes O of the camera unit 30 to be calibrated. The collimated images can thus be formed at desired positions within the entire range of images acquired by the camera unit 30.

This makes it possible to perform accurate calibration (measurement) within the entire imaging range without taking much space, and perform an appropriate image correction process based on the result of the calibration within the entire range of images. The calibrating apparatus 1 of the present embodiment can thus perform calibration and correction processes on the camera unit 30 with high accuracy.

The disclosure is not limited to the embodiments described above, and various modifications and applications can be implemented within a range that does not deviate from the gist of the disclosure. The embodiments described above include disclosures of various stages, and various disclosures can be extracted by appropriately combining the disclosed constituent elements. For example, if a problem to be solved by the disclosure can be solved and the effects of the disclosure can be achieved even after omitting some constituent elements from all the constituent elements of the embodiment, then the configuration obtained by omitting the constituent elements can be extracted as a disclosure. Components according to different embodiments may be combined where appropriate. The disclosure is limited by the accompanying claims and is not limited by a specific embodiment.

The disclosure can provide a camera unit calibrating apparatus and a camera unit calibrating method that can highly accurately measure (calibrate) and correct geometric distortions in images acquired by imaging an object placed at infinity, over the entire range of the acquired images, in a space-saving manner without taking much space.

The invention claimed is:

1. A camera unit calibrating apparatus configured to be applied to a camera unit and to perform a predetermined measurement based on images acquired by imaging the same object from different viewpoints by using cameras of the camera unit, the camera unit calibrating apparatus comprising:

a collimator unit comprising collimators corresponding to the cameras respectively, collimator driving devices corresponding to the collimators respectively, a support unit configured to support the collimators in such a way as to allow the collimators to be translated individually within a predetermined plane, and a collimator control unit configured to control the collimators and the collimator driving devices; and a control unit configured to control the collimator unit, wherein the control unit is configured to control each of the collimator driving devices to individually set a corresponding one of the collimators to a predetermined position and orientation, and the control unit is configured to cause each of collimated images produced by the collimators to be formed at a desired position within a range of an imaging area of a corresponding one of the cameras.

2. The camera unit calibrating apparatus according to claim 1, wherein optical axes of collimated beams from the collimators are set non-parallel to optical axes of the cameras.

3. The camera unit calibrating apparatus according to claim 1, wherein the control unit is configured further to:
  determine, based on setting information of the collimators, an assumed imaging coordinate of each of the collimated images in a corresponding one of reference images, and calculate image shifts in the assumed imaging coordinates;
  estimate an actual imaging coordinate of each of the collimated images formed in the imaging area of the corresponding one of the cameras, and calculate an image shift in the actual imaging coordinate;
  perform a calibration process that compares the image shift in the assumed imaging coordinate with the image shift in the actual imaging coordinate; and
  perform an image correction process that corrects a geometric distortion in an actual image to make the image shift in the actual imaging coordinate equal to the image shift in the assumed imaging coordinate.

4. The camera unit calibrating apparatus according to claim 1, wherein the camera unit is a stereo camera unit.

5. A camera unit calibrating method for performing a predetermined measurement based on images acquired by imaging the same object from different viewpoints by using cameras of a camera unit, the camera unit calibrating method comprising:
  controlling each of collimator driving devices to individually set a corresponding one of collimators to a predetermined position and orientation;
  causing each of collimated images produced by the collimators to be formed at a desired position within a range of an imaging area of a corresponding one of the cameras;
  determining, based on setting information of the collimators, an assumed imaging coordinate of each of the collimated images in a corresponding one of reference images, and calculating image shifts in the assumed imaging coordinates;
  estimating an actual imaging coordinate of each of the collimated images formed in the imaging area of the corresponding one of the cameras, and calculating an image shift in the actual imaging coordinate;
  performing a calibration process that compares an image shift in the assumed imaging coordinate with the image shift in the actual imaging coordinate; and
  performing an image correction process that corrects a geometric distortion in an actual image to make the image shift in the actual imaging coordinate equal to the image shift in the assumed imaging coordinate.

6. A camera unit calibrating apparatus configured to be applied to a camera unit and to perform a predetermined measurement based on images acquired by imaging the same object from different viewpoints by using cameras of the camera unit, the camera unit calibrating apparatus comprising:
  a collimator unit comprising collimators corresponding to the cameras respectively, collimator driving devices corresponding to the collimators respectively, and a support unit configured to support the collimators in such a way as to allow the collimators to be translated individually within a predetermined plane; and
  circuitry configured to control the collimator unit, wherein
  the circuitry is configured to control each of the collimator driving devices to individually set a corresponding one of the collimators to a predetermined position and orientation, and
  the circuitry is configured to cause each of collimated images produced by the collimators to be formed at a desired position within a range of an imaging area of a corresponding one of the cameras.

* * * * *